United States Patent
Kindberg

(10) Patent No.: US 9,821,827 B2
(45) Date of Patent: Nov. 21, 2017

(54) COLLAPSIBLE WHEELED SUPPORT OR CARRIER

(71) Applicant: TRIONIC SVERIGE AB, Uppsala (SE)

(72) Inventor: Stefan Kindberg, Uppsala (SE)

(73) Assignee: TRIONIC SVERIGE AB, Uppsala (SE)

(*) Notice: Subject to any disclaimer, the term of this patent is extended or adjusted under 35 U.S.C. 154(b) by 0 days.

(21) Appl. No.: 15/117,801

(22) PCT Filed: Feb. 10, 2015

(86) PCT No.: PCT/EP2015/052783
§ 371 (c)(1),
(2) Date: Aug. 10, 2016

(87) PCT Pub. No.: WO2015/121264
PCT Pub. Date: Aug. 20, 2015

(65) Prior Publication Data
US 2017/0008544 A1    Jan. 12, 2017

(30) Foreign Application Priority Data

Feb. 14, 2014 (EP) .................................. 14155246

(51) Int. Cl.
*B62B 3/02* (2006.01)
*A61H 3/04* (2006.01)
(Continued)

(52) U.S. Cl.
CPC ................. *B62B 3/02* (2013.01); *A61H 3/04* (2013.01); *B62B 7/042* (2013.01); *B62B 7/062* (2013.01);
(Continued)

(58) Field of Classification Search
CPC .. B62B 3/00; B62B 3/02; B62B 3/027; B62B 7/042; B62B 7/04; B62B 7/062;
(Continued)

(56) References Cited

U.S. PATENT DOCUMENTS 3,736,021 A * 5/1973 MacLaren ................ A61G 5/08
280/39
3,848,884 A    11/1974 Lines et al.
(Continued)

FOREIGN PATENT DOCUMENTS

DE        19754984 A1    6/1999
DE    102004036864 A1    2/2006
(Continued)

*Primary Examiner* — James M Dolak
(74) *Attorney, Agent, or Firm* — Drinker Biddle & Reath LLP

(57) ABSTRACT

A laterally collapsible, user-pushed, four-wheeled rollator, stroller or the like has swiveling front wheels for steering, each mounted in a fork with a vertical post, with a toothed pulley fixed thereto, rotatable in a bearing housing fixed at the front end of right and left side frames. The two swiveling front wheels can swivel to any steering angle but always in unison with each other by virtue of a flexible toothed synchronous belt extending between the toothed pulleys. The interior of each bearing housing closely surrounds each toothed pulley and the belt, preventing any disengagement of the belt from either toothed pulley even when the belt becomes slack when the left and right side frames are folded towards each other. A synchronous chain with sprockets can also be used. Tether means pull the belt/chain rearwardly to a protected position during folding.

20 Claims, 13 Drawing Sheets

(51) Int. Cl.
*B62B 7/04* (2006.01)
*B62B 7/06* (2006.01)

(52) U.S. Cl.
CPC .. *A61H 2201/0161* (2013.01); *B62B 2205/02* (2013.01); *B62B 2301/06* (2013.01)

(58) Field of Classification Search
CPC ... B62B 7/06; B62B 2205/00; B62B 2205/02; B62B 2205/06; B62B 2205/18; A61H 3/04; A61H 3/00
See application file for complete search history.

(56) References Cited

U.S. PATENT DOCUMENTS

| | | | |
|---|---|---|---|
| 4,203,609 A | 5/1980 | Mitchell et al. | |
| 5,348,336 A * | 9/1994 | Fernie | A61H 3/04 280/42 |
| 5,676,388 A * | 10/1997 | Bertani | A61H 3/04 280/250.1 |
| 6,814,368 B2 | 11/2004 | Cheng | |
| 7,306,246 B2 * | 12/2007 | Gale | A61H 3/04 280/47.34 |
| 7,422,550 B1 * | 9/2008 | Pinero | A61H 3/008 135/65 |
| 7,445,217 B1 * | 11/2008 | Price | A61H 3/04 135/67 |
| 7,559,560 B2 * | 7/2009 | Li | A61H 3/04 16/35 R |
| 8,186,367 B1 * | 5/2012 | Le Tran | A61H 3/00 135/67 |
| 8,333,208 B2 * | 12/2012 | Miller | A61H 3/04 135/67 |
| 8,708,363 B1 * | 4/2014 | Chang | A61H 3/04 135/67 |
| 8,726,922 B2 * | 5/2014 | Pak | A61H 3/00 135/67 |
| 8,827,284 B2 * | 9/2014 | Walther | B62K 5/023 280/87.041 |

FOREIGN PATENT DOCUMENTS

| | | |
|---|---|---|
| EP | 0890497 A2 | 1/1999 |
| EP | 1028882 B1 | 3/2006 |
| EP | 2366372 A1 | 9/2011 |
| EP | 2398687 B1 | 7/2016 |
| FR | 2843728 A1 | 2/2004 |
| GB | 364269 A | 1/1932 |
| NL | 1028058 C2 | 7/2006 |
| WO | WO-2006/122508 A1 | 11/2006 |
| WO | WO-2007/101293 A1 | 9/2007 |
| WO | WO-2010/091513 A1 | 8/2010 |

* cited by examiner

COLLAPSIBLE WHEELED SUPPORT OR CARRIER

CROSS-REFERENCE TO PRIOR APPLICATIONS

This application is a §371 National Stage Application of PCT International Application No. PCT/EP2015/052783 filed Feb. 10, 2015, which claims priority to European Patent Application No. 14155246.3 filed Feb. 14, 2014, each of which are herein incorporated by reference in their entirety.

TECHNICAL FIELD

Generally, embodiments of the invention relate to collapsible hand-propelled wheeled supports or carriers such as foldable rollators, walkers, pushchairs and strollers.

More specifically, different embodiments of the application relate to foldable rollators, walkers, pushchairs and strollers which have two swiveling front caster wheels to steer the assembly when pushed in the desired direction.

BACKGROUND

Many different types of rollators, walkers, pushchairs and strollers are known in the art. Many have front caster wheels which automatically align themselves in the direction towards which the assembly is pushed from behind. Many assemblies or carriers such as rollators, walkers, pushchairs and strollers are foldable for easy storage and transport in a car for example. Some designs also have means to make the front wheels always point in the same direction.

RELATED ART

EP 1 028 882 discloses a non-collapsible hand-propelled cart having two pairs of steerable wheels. Each pair of wheels has a tie rod between them to keep the two wheels of each pair pointing in the same direction. There is also a diagonal linkage connecting the two pairs and forcing each pair of wheels to be directed oppositely to the wheels of the other pair, thus facilitating turning using both the front and the rear wheels.

EP 2 39 8687 (WO 2010/091513) shows a stroller with free independently swiveling front caster wheels. The stroller is collapsible by folding the top section forward over the bottom section, i.e. about an axis transverse to the longitudinal axis of the stroller.

U.S. Pat. No. 4,203,609 discloses a non-collapsible four-wheeled pull-cart, with a pair of front wheels linked to each other to turn in unison and a pair of rear wheels also linked to each other to turn in unision. The front and rear pairs are linked to each other to force the rear pair to turn counter to the front wheels thus making it easier for the cart to turn along an arc.

U.S. Pat. No. 3,848,884 describes a collapsible stroller which shows non-swivelable wheels (i.e. fixed in the straight-forward direction). Foldable linkages allow the entire stroller to be folded upwards sliding along a central shaft.

WO2006122508 describes a collapsible stroller with two pairs of non-swivelable double wheels. Connecting lateral and longitudinal scissors mechanisms allow the stroller to be collapsed both laterally and longitudinally.

FR 2843728 also describes a collapsible stroller with two pairs of non-swivelable double wheels. Connecting lateral and longitudinal scissors mechanisms allow the stroller to be collapsed both laterally and longitudinally.

EP0890497 describes a collapsible pushchair having two directionally fixed rear wheels and two independently freely swivelable front wheels. Scissor mechanisms allow folding together of the pushchair both longitudinally and laterally.

EP 2 366 372A1 describes a laterally collapsible rollator having a scissors strut assembly between the two frames, but with no synchronous steering of the two front swivel wheels.

WO2007101293 discloses a non-collapsible pushcart where the two pivotable wheels on right side are linked by a belt crossed midway so that these two right side wheels swivel counter to each other. The same arrangement is disposed for the left side wheels. This directs the rear wheels counter to the front wheels facilitating arcuate turning.

NL1028058 describes a non-collapsible rollator which, the front wheels of which are steered in unison by the two handlebars attached to a central vertical post controlling, via tie bars, each of the front wheels.

DE 102004 036 864 A1 discloses a non-collapsable rollator where the two front steering wheels the swivel axles of which are coupled together via a friction belt, which can slip to allow the wheels to accommodate corners or to get back into alignment.

GB 364269 A describes a non-collapsable truck or other wheeled frame the front wheels of which are steered by a chain. The entire chain is covered by tubes and housings.

DE 19754984 A1 describes a non-collapsable hand lever for adjusting a vehicle seat where two toothed wheels at either end are coordinated by a toothed belt, which is restricted by guide means which prevent the toothed belt from skipping.

However, none of the related art discloses or hints at how to achieve the solutions provided by the present invention.

OBJECT OF THE INVENTION

The present invention intends to solve a complex of difficult-to-reconcile interrelated problems still present in the designs of the prior art:

1. It is desirable to allow the wheel assembly to be collapsible (foldable) laterally. This permits it to still stand on its wheels and be rolled forward even in the collapsed (folded) storage state, making it easier to handle it in the collapsed state, obviating heavy lifting. Lateral folding keeps the handles at the same level even when being folded together. This is important for a disabled person using a rollator for example.
2. It is desirable to have a hand-pushed wheeled assembly such as a rollator have its caster wheels always swivel in unison. This prevents one of the front wheels from being skewed to one side and halting abruptly the forward progress of the rollator. Synchronous steering also prevents so-called shimmying, which definitely detracts from feel, dependability and steerability. When being pushed at an angle over an obstacle such as a curb, synchronous steering will prevent the wheel first striking the curb at an angle from being forced parallel against the curb thus abruptly braking the entire rollator or stroller. With synchronous steering the friction of the other wheel not yet at the curb will prevent the forward wheel from changing its steering angle as it strikes the curb.
3. This swiveling in unison must always be secure without slippage or skipping, even after being folded up and folded out repeatedly.

4. It is desirable to allow unlimited swiveling of the front wheels (i.e. with no end stop). This allows for easier repeated backward and forward movement as desired.
5. It is desirable to eliminate unnecessary components, and to keep components requiring narrow tolerances to a minimum.
6. Any linkages should be securely protected from the elements.

SUMMARY

This entire complex of problems listed above finds its solution in the invention as defined in the appended main patent claim.

BRIEF DESCRIPTION OF DRAWINGS

Embodiments of the invention will now be described in more detail with reference to the appended drawings, wherein.

DETAILED DESCRIPTION

Figures 1A, 1B:
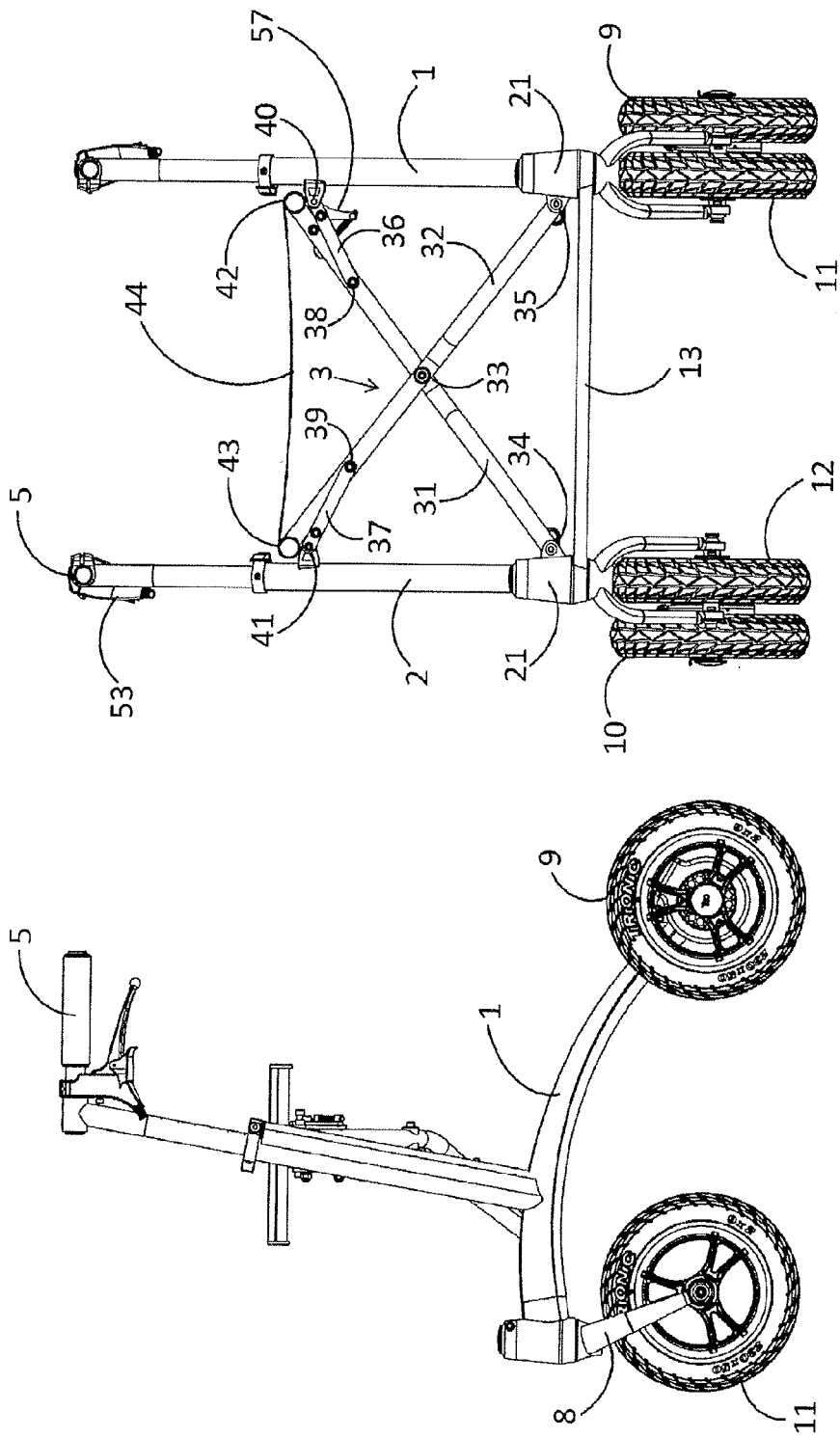
FIGS. 1a and 1b show side and frontal views respectively of a four-wheeled laterally collapsible (foldable) rollator, which is one embodiment of the present invention.
Figure 1C:
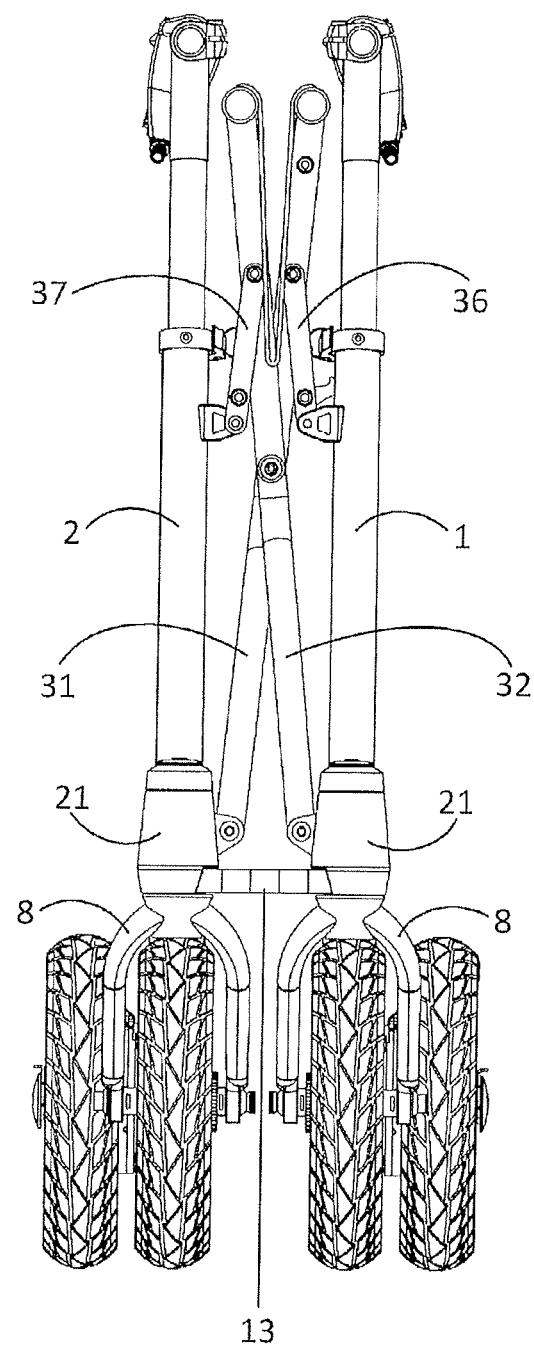
FIG. 1c shows the rollator of FIGS. 1a and 1b in its collapsed folded-up state.
Figure 2:
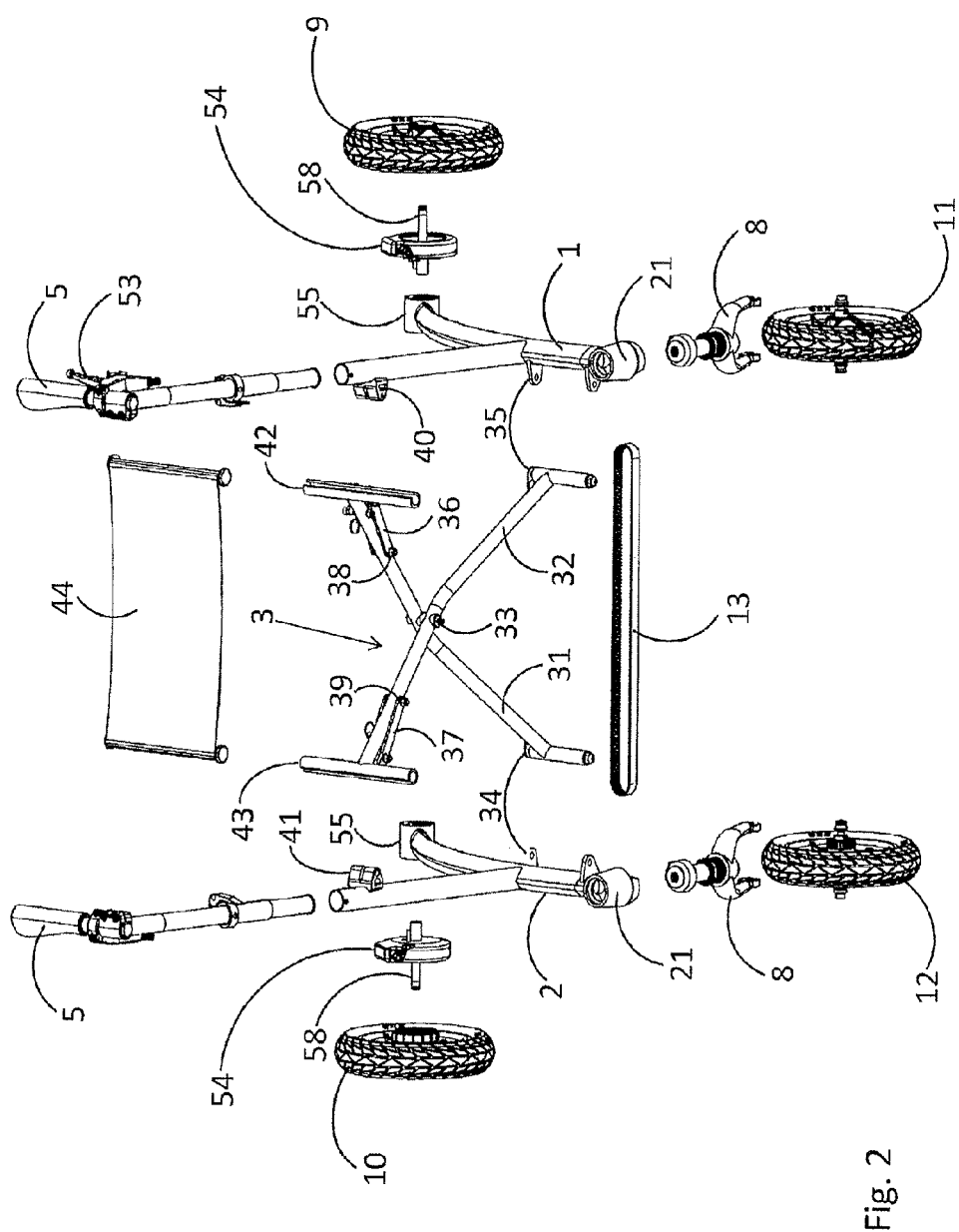
FIG. 2 shows an exploded view of the rollator shown in FIGS. 1a and 1b.

FIGS. 1a and 1b show side and frontal views respectively of a rollator embodying the present invention. FIG. 2 shows an exploded view of the entire rollator. The rollator basically has left and right frames, 1 and 2 respectively, each frame being supported on a front wheel 11, 12 and a rear wheel 9, 10. The two side frames 1 and 2 are connected both in the folded out and the collapsed state by a scissor frame 3. The scissor frame 3 comprises two cross pieces 31, 32, articulated to each other at a central pivot point 33. The lower end of each cross piece 31, 32 is hinged to the left or right frame 1 and 2 respectively at 35 and 34 respectively. Towards the upper end of each cross piece 31, 32 an extension arm 36 and 37 respectively is hinged at 38 and 39 respectively. The other end of each extension arm 36, 37 is hinged to the left or right side frame 1 or 2 respectively, at 40 and 41 respectively. 13 designates a flexible toothed synchronous belt which will be described in more detail below. Thus, the scissor frame 3 can be collapsed bringing the side frames close together for storage, without any detachment of any hinge or pivot point, as shown in FIG. 1c.

At the very upper end of each cross piece 31, 32 there is welded a longitudinal slot piece 42 or 43 respectively. Each slot is designed to hold an end hem, containing a cord or a rod, of a fabric seat 44 stretched between the longitudinal slot pieces 42, 43. The rollator can be used either with or without the fabric seat 44. The fabric seat 44 collapses as the scissors frame 3 collapses.

The scissors frame assembly is also locked against collapse by a small arm and spring mechanism 57 (see FIG. 1b). This lock engages automatically when the rollator is fully expanded and is released for folding by pulling up on the arm, either directly or via a strap (not shown).

Figure 3:
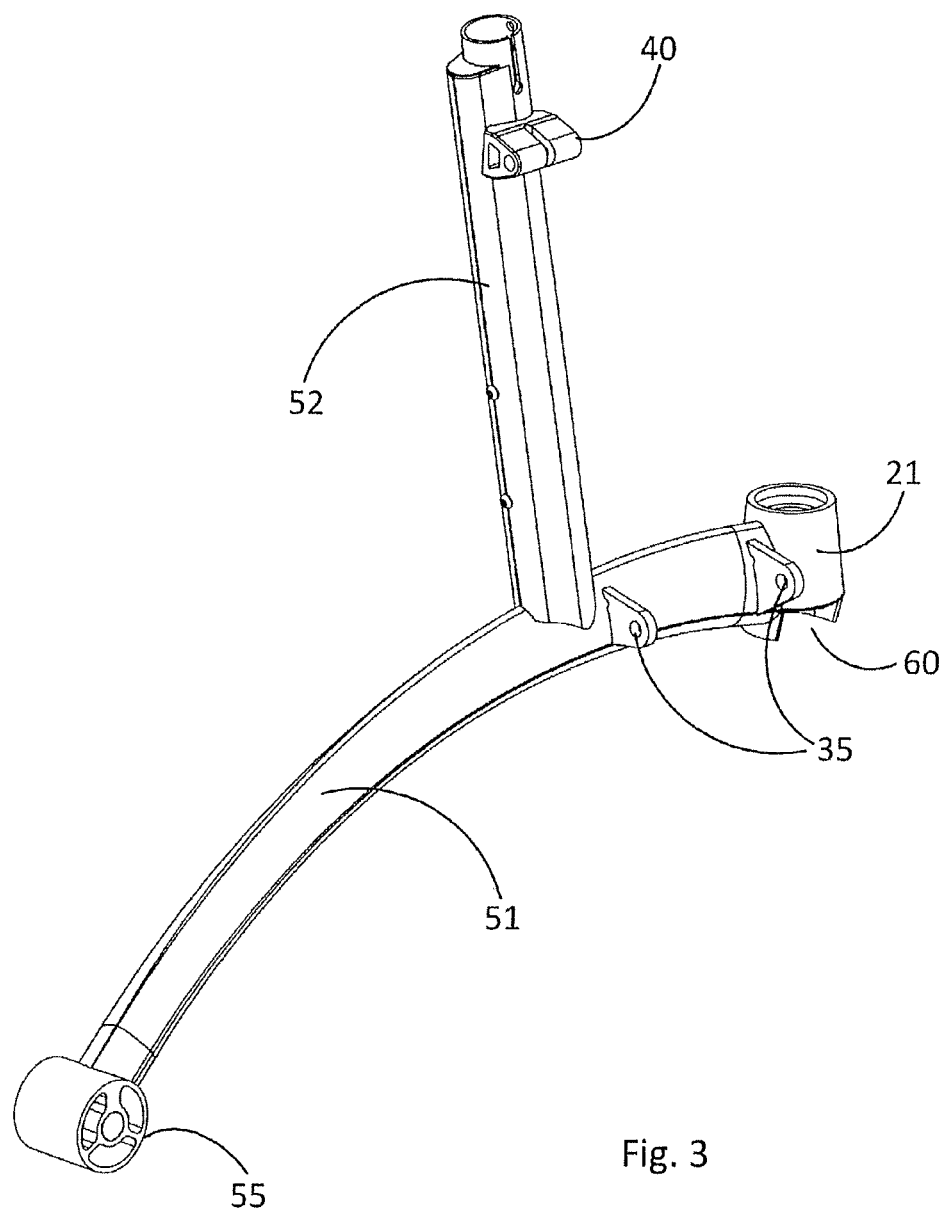
FIG. 3 is a view of the left-hand frame of the rollator.

As best can be seen in FIG. 3 showing the left side frame 2, each frame comprises a horizontal bar 51 and a vertical post 52. As can be seen in FIGS. 1a, 1a and 2, a handlebar assembly 5 is inserted into each post 52 and is adjusted to assume the correct height for the user. As can be seen in these figures each handlebar assembly 5 comprises a brake lever 53 which is coupled via a cable to a brake 54 on the left or right rear wheel 9, 10 respectively. FIG. 3 shows clearly the journal bearing 55, supporting the axle 58 of the rear wheel 9 or 10.

Figure 4B:
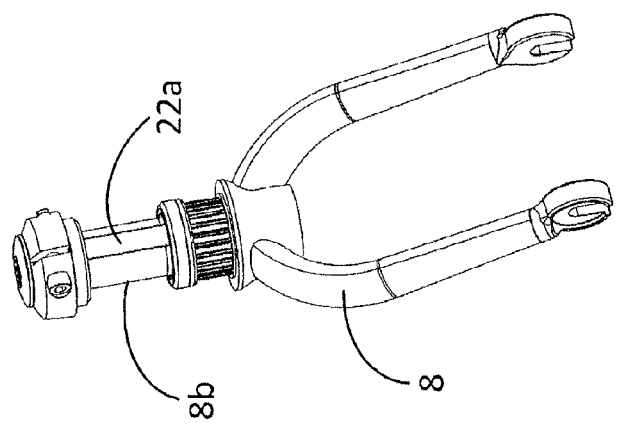
FIGS. 4a and 4b show the assembled front wheel fork in exploded and unexploded views respectively.
Figure 4A:
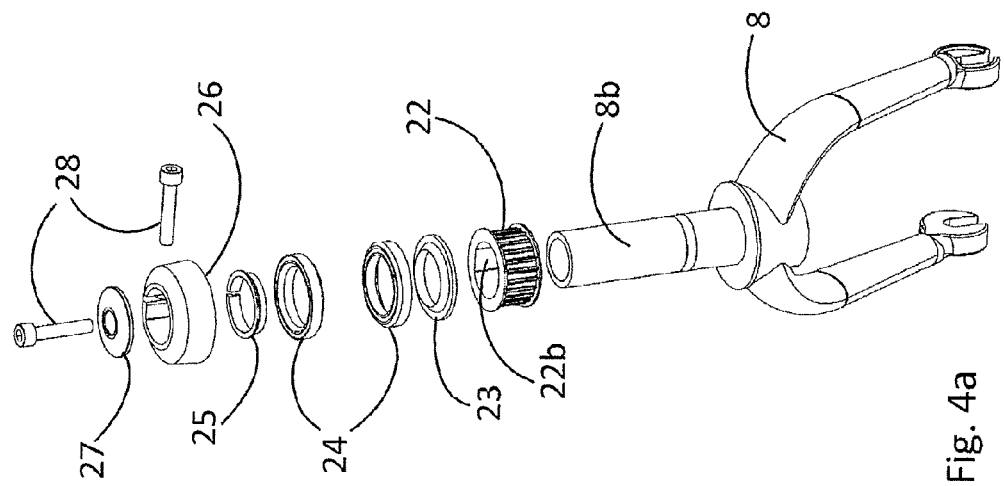

The forward end of the horizontal bar 51 of each side frame 1 and 2 has a journal bearing housing 21 for the steering post 8b of each front wheel fork 8. This front wheel fork 8 is shown most clearly in FIGS. 4a and 4b which show the front wheel fork assembly in exploded and assembled views respectively. FIGS. 4a and 4b do not show the journal bearing housing 21 welded to the front of the horizontal bar 51 of each side frame 1, 2. The assembled fork and side frame is only shown in FIGS. 1a and 1b.

The steering post 8b is provided with a flat side 22a fitting the flat side 22b on the interior of a toothed pulley 22. The steering fork can swivel/rotate as many degrees as desired in the journal bearing housing 21. It is held in place in the journal bearing housing 21 by a ring cap 26 secured in place by a washer 27 and screws 28 with intermediate ball bearings 24 and ball bearing races 23, 25.

A synchronous toothed belt 13 links the two toothed pulleys 22 and thus the forks 8 securely fixed to the pulleys 22, making sure that the two front wheels 11, 12 are always pointing in the same direction. This is important to see to prevent one of the front wheels from skewing off and assuming a position at right angles to the direction of motion of the walker.

It is known to steer a wheeled support by pushing it in the desired direction, with freely swivelable front wheels mounted in forks inclined slightly rearwardly. Hopefully, in prior art solutions within dependently freely swiveling front wheels, the two front swivel wheels will steer themselves in the same direction. The present invention insures that as the user steers the rollator by pushing it in the desired direction, both of the front steered wheels will swivel in exactly the same direction. The two front wheel/fork assemblies are otherwise freely unlimitedly swivelable, even multiple rotations and will never reach a rotational end position, where they would be prevented from steering properly, even if the user backs, turns and then proceeds forward. There is no need in the present invention to have any active steering of the front wheels as is the case in NL1028058.

Figure 5:
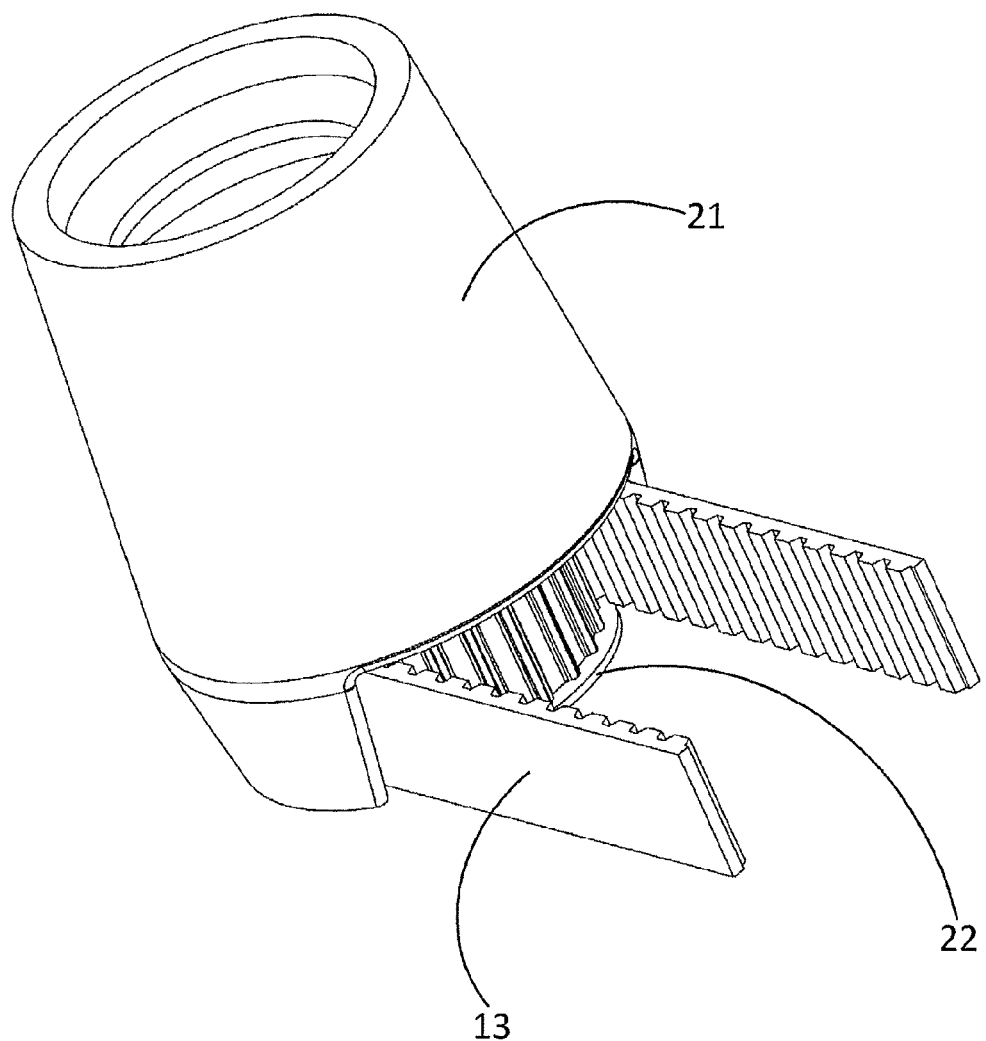
FIG. 5 shows in perspective the bearing housing with a toothed belt wheel and a synchronous belt.
Figure 6:
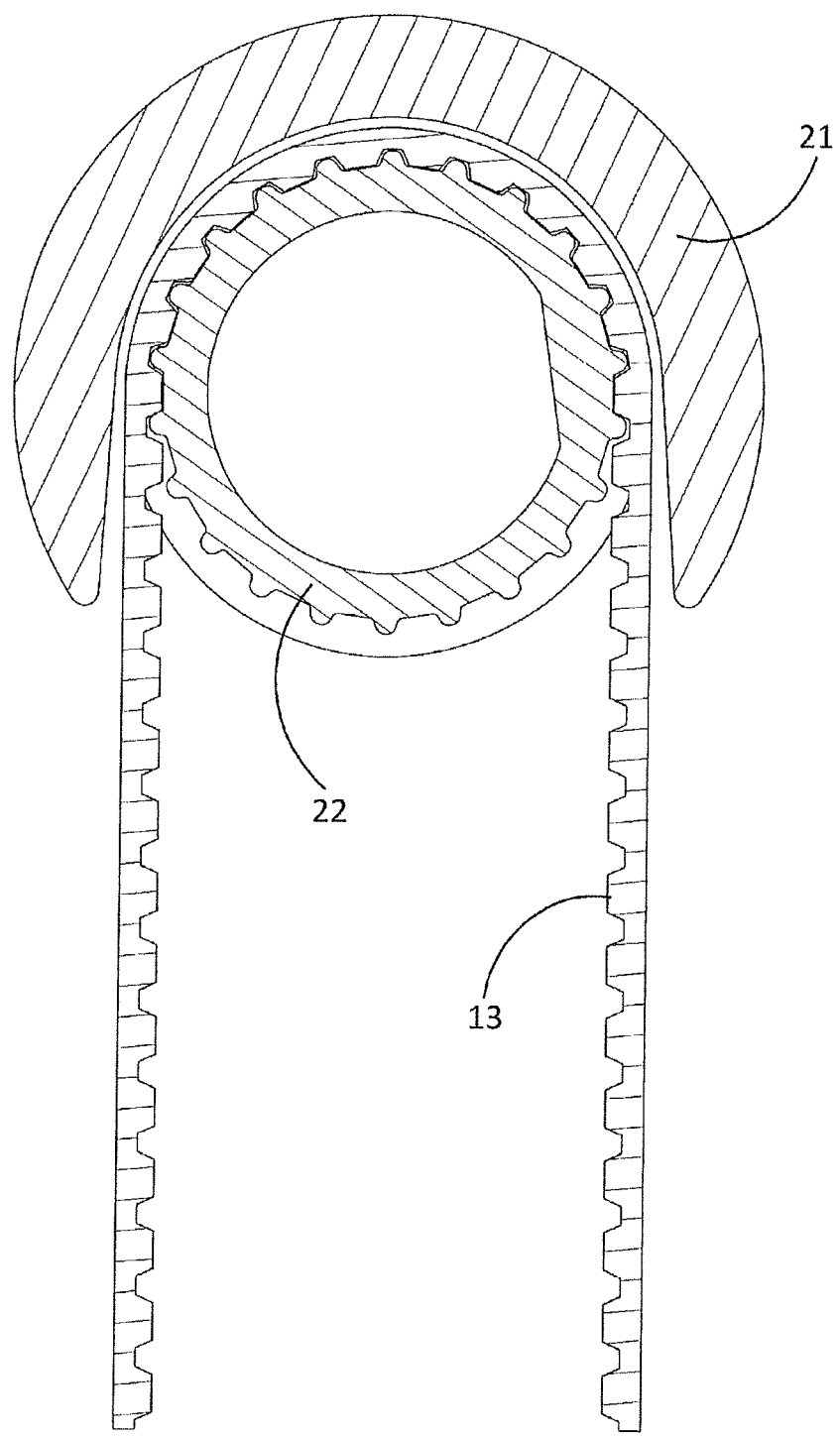
FIG. 6 shows a cross-sectional view through the bearing housing of FIG. 5.

One significant problem which the present invention solves is combining lateral collapsibility with a synchronous belt which will never slip or skip in its exact engagement with the toothed pulleys, when repeatedly folding up and folding out the rollator. If one of the pulleys were to slip or skip a few cogs relative to the belt, this would render the rollator unusable, since the front wheels would then be compelled to steer in different directions. This problem is solved by the unique design of the front journal bearing housings 21. As can be seen in FIGS. 5 and 6, showing a perspective view and a cross sectional view respectively of only the journal bearing housing 21, the toothed pulley 22 and part of the synchronous belt 13, there is an opening 60 (visible in FIG. 3 as well) on the lower inside of the housing 21. The housing 21 thus surrounds in very close proximity the entire portion of the synchronous belt in engagement with the toothed pulley 22. It is thus physically impossible for the belt 13 to slip in relation to the pulley 22, even when the belt is collapsed. Beyond holding the pulley always in secure engagement with the synchronous belt 13, the journal bearing housing also is a journal bearing for supporting the post 8b of the swivel fork 8. The housing 21 can be made to very precise tolerances in a single compact component. This surrounding of the synchronous belt also fulfills another requirement of shielding the pulley from rain and snow.

Figure 7B:
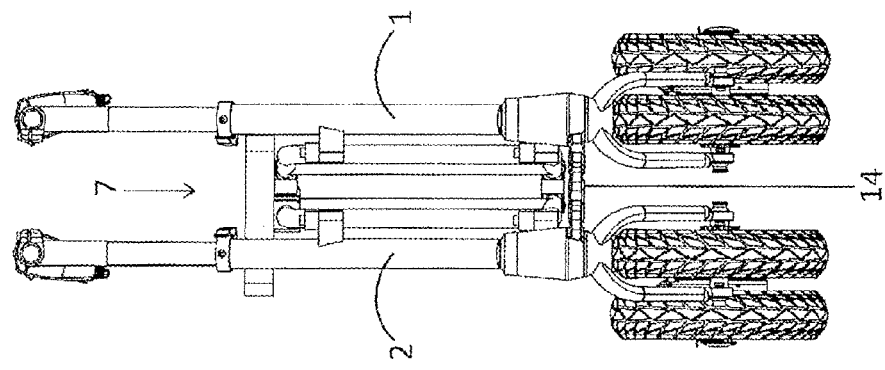
FIGS. 7a and 7b show a folded-out and a folded up view respectively of another embodiment of the present invention using a synchronous chain and a centrally hinged vertical brace frame as struts.
Figure 7A:
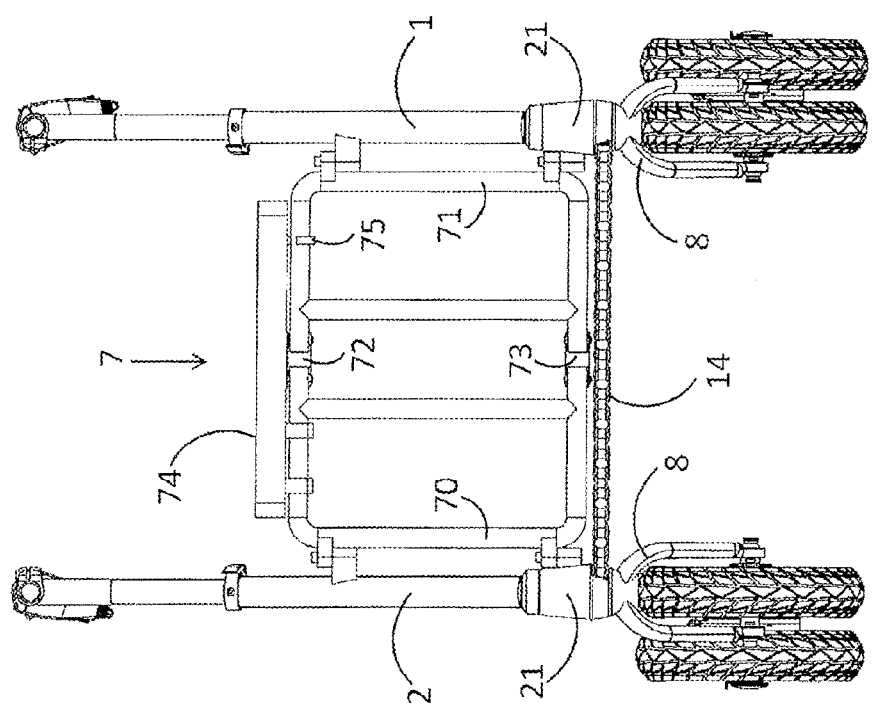
Figure 8:
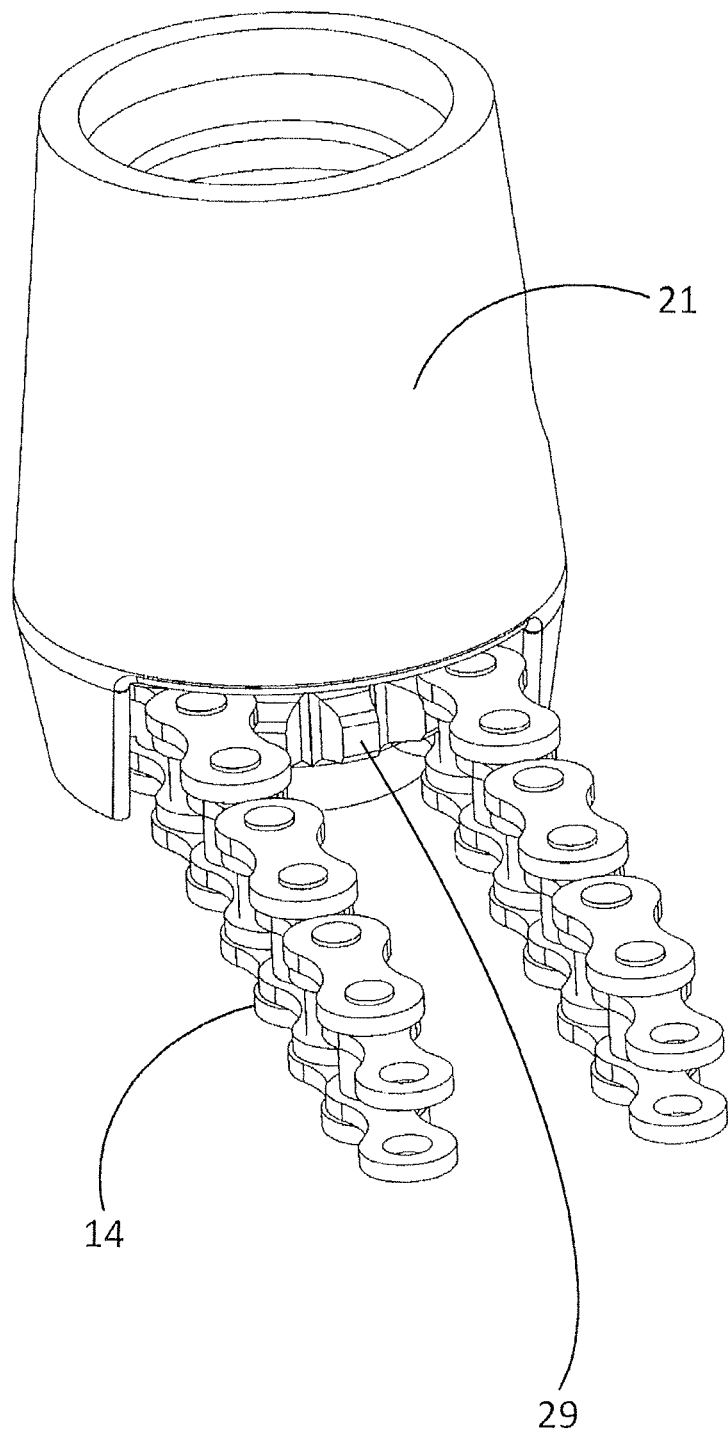
FIG. 8 shows in perspective the bearing housing with a sprocket and a synchronous chain.

As can be seen in FIGS. 7a and 7b, other embodiments of the present invention involve replacing the synchronous toothed belt 13 and toothed pulley arrangement with a synchronous chain 14 and sprockets 29. Elements corresponding to those in the first embodiment above have received the same reference numerals. See also FIG. 8 which corresponds to the perspective view of FIG. 5 but using a synchronous chain 14 and sprockets 29 instead of a belt 13 and toothed pulleys 22. The sprockets 29 are each fixedly mounted on an individual steering post 8b, in the manner of the arrangement described above. Otherwise, the arrangement functions exactly as does the toothed belt/toothed pulley arrangement, with the precise tolerances of the inside of the journal bearing housing 21 preventing the chain 14 from ever becoming disengaged from or slipping in relation to the sprockets 29 (see FIG. 8).

Figure 9B:
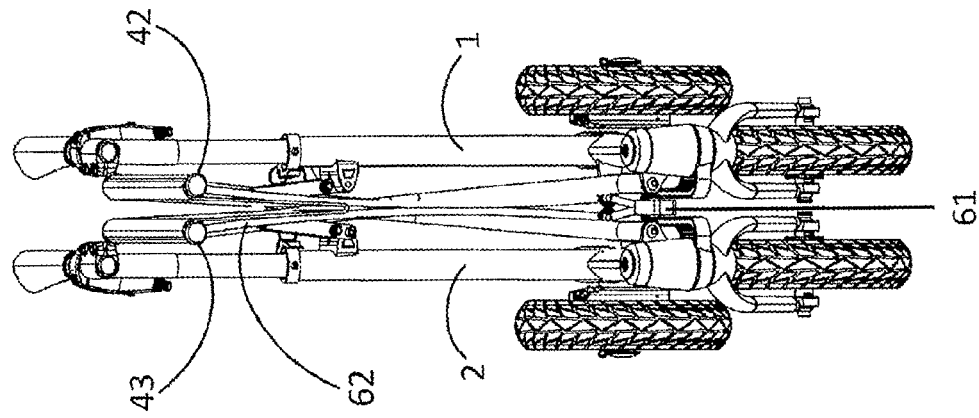
FIGS. 9a and 9b show a folded-out and a folded up view respectively of another embodiment of the present invention using a tether arrangement pull the belt/chain rearwardly to a protected position during folding.
Figure 9A:
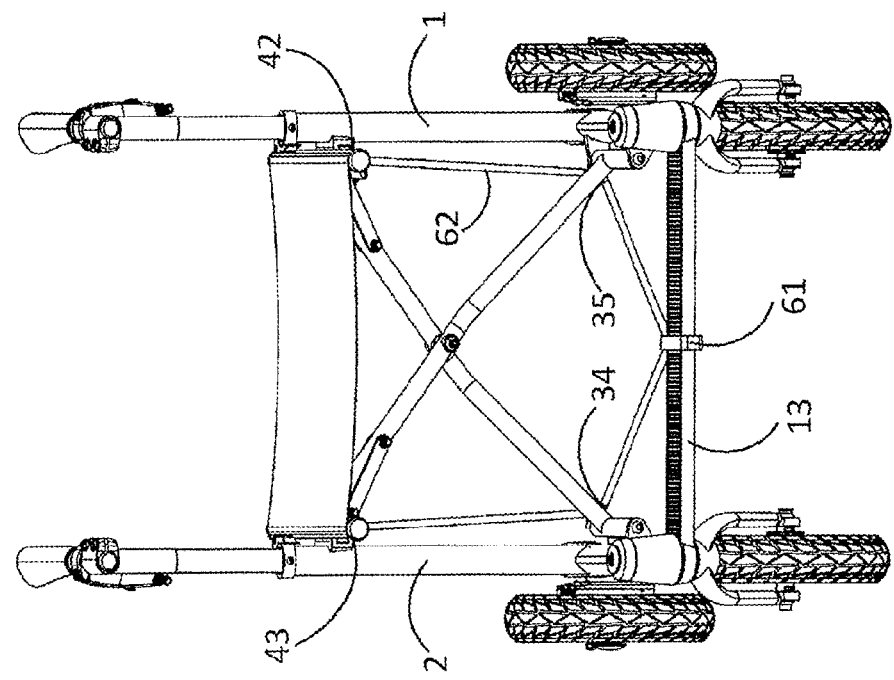
Figure 10B:
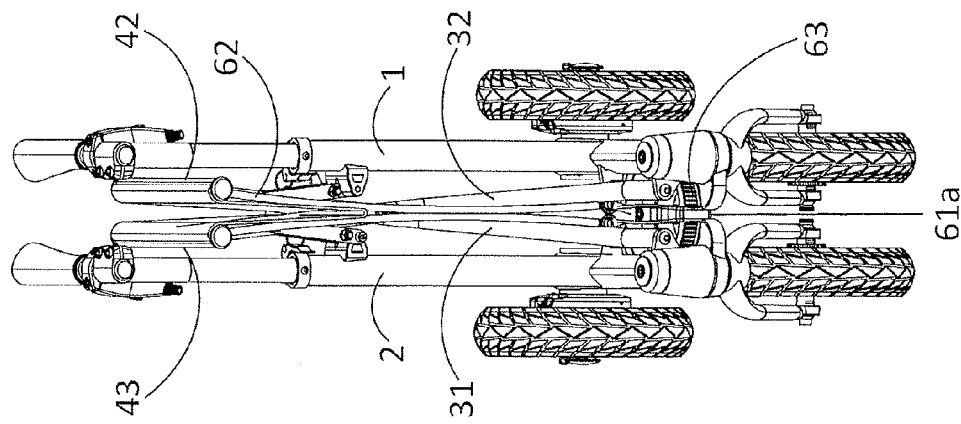
FIGS. 10a and 10b show a second embodiment of the tether arrangement according to the invention.
Figure 10A:
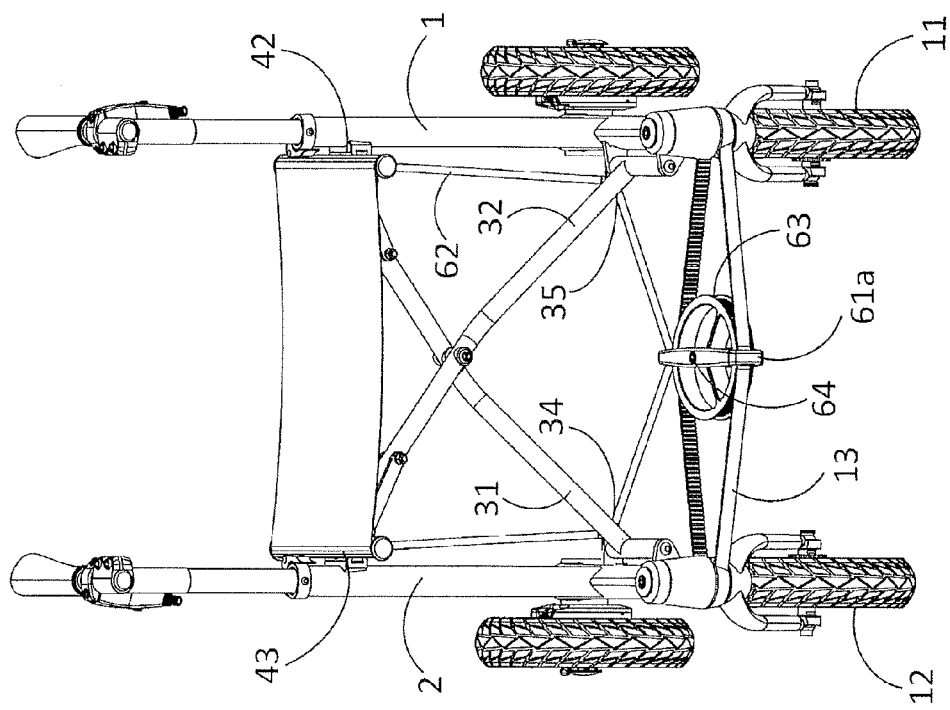
Figure 10C:
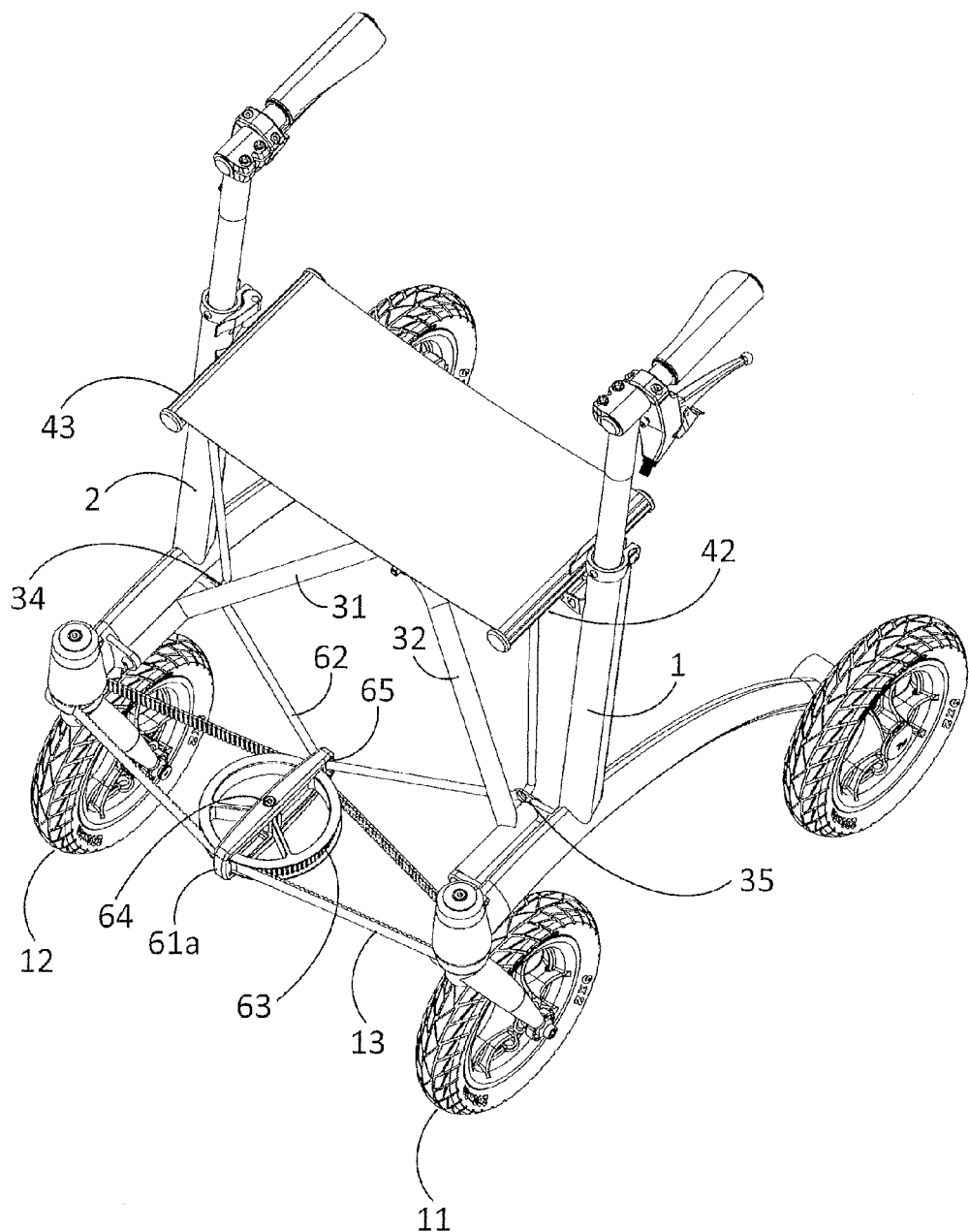
FIG. 10c shows this second embodiment in a perspective view.
Figure 10D:
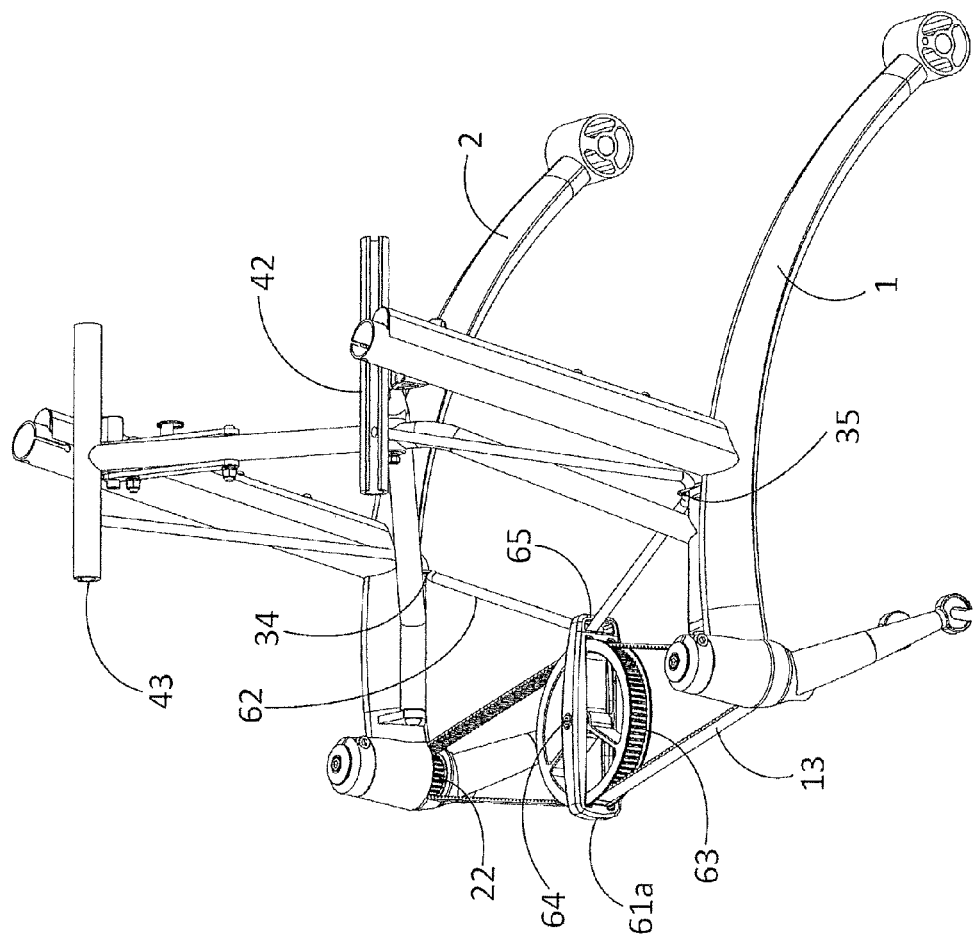
FIG. 10d shows this second embodiment with the wheels and seat removed for better visibility of the tether arrangement.

For embodiments employing either a synchronous toothed belt or a synchronous chain, it is possible to ensure that during the folding up the toothed belt 13 or chain 14 always folds rearwardly between the two side frames, instead of forward where the toothed belt or chain would stick out and possibly become entangled and/or damaged. FIGS. 9a and 9b show how this is achieved in one embodiment by having a loose ring or loop 61 around the toothed belt or chain. In this particular embodiment a tether cord 62 is attached at its ends to the longitudinal slot pieces 42, 43. The tether cord 62 passes in this particular embodiment from the one longitudinal slot piece 42 through an eye at strut hinge 35, through the loop 61, through a second eye at strut hinge 34 and finally up to longitudinal slot piece 43. As the two side frames 1 and 2 are folded together, the two longitudinal slot pieces 42, 43 will pull the tether cord ends upwards, thereby pulling the toothed belt 13 or the chain 14 rearwards so that it will be protected in the folded up position and will not stick out forwards.

FIGS. 10a, 10b, 10c and 10d (wheels and seat removed for visibility) show an alternative embodiment from that shown in FIGS. 9a and 9b. Here the loop 61 of FIGS. 9a and 9b has been replaced with a rigid rectangular frame 61a holding an externally toothed wheel 63 freely rotatably mounted on an axle 64 held in the frame 61a. The toothed wheel 63 engages the toothed belt 13 and rotates when the front wheels 11, 12 are steered together. The interior of the frame 61a is dimensioned so as to prevent the toothed belt 13 from ever skipping or slipping over any of the teeth on the toothed wheel 63, thus always keeping the toothed wheel 63 and the frame 61a always exactly centrally placed midway in the belt 13, however the front wheels 12 and 13 are oriented. The tether cord 62 slips freely through a slot at the rear of the rectangular frame 61a. As is the case with the previously described tether arrangement, the ends of the tether cord are attached to the longitudinal slot pieces 42, 43 fixed to the diagonal struts 31, 32. (most clearly visible in FIG. 10d). When the two frames 1 and 2 are folded towards each other, the ends of the tether cord 62 are raised with the longitudinal slot pieces 42, 43 and the rectangular frame 61a and the toothed belt 13 will be pulled backwards in the same manner as described in the preceding paragraph with regard to FIGS. 9a and 9b, finally assuming the position shown in FIG. 10b. This embodiment has the advantage of stabilizing the toothed belt as it is pulled rearwardly, and the position of the rectangular frame/toothed wheel will always be midway along the toothed belt in all positions of the wheeled assembly.

As can be seen in FIGS. 7a and 7b it is possible to replace the scissors strut arrangement with a vertical brace frame 7. The brace frame 7 consists of two brace frame halves 70, 71 that are hinged together in the middle with two hinge brackets 72, 73. A rigid seat 74 is fixedly mounted to the one brace frame half 70. The brace frame 7 is locked against collapse by a small arm and spring mechanism 75 attached to said seat 74. This lock engages automatically with the brace frame half 71 when the rollator is fully expanded and is released for folding by pulling up on the arm, either directly or via a strap (not shown). The vertical brace frame 7 can fold rearwards as the rollator is folded up.

The person skilled in the art will of course realize that the brace frame arrangement shown in FIGS. 7a and 7b can be combined with toothed pulleys and a synchronous belt as well, with or without a tether to pull the chain or belt rearwards as the rollator is folded up.

It is also understood that the present invention is not limited to rollators, but encompasses other collapsible wheeled support devices, including push chairs and strollers utilizing swivelable front steering wheels.

The invention claimed is:

1. A collapsible hand-propelled wheeled support or carrier, such as a rollator, walker, pushchair or stroller, comprising:
   a) left and right side frames each supporting at least individual front and rear wheels;
   b) each of said front wheels being mounted on a vertical post and swivelable about a vertical axis;
   c) toothed pulleys fixedly mounted one on each post;
   d) a flexible toothed synchronous belt engaging each toothed pulley and extending between them;
   e) folding struts extending between said left and right side frames, permitting moving said left and right frames laterally towards each other to a collapsed or folded storage position and away from each other to an expanded or folded-out stable position for use of the wheeled support or carrier; and
   f) journal bearing housings fixedly mounted on each of said left and right frames and each swivelably holding one each of said vertical posts with said toothed pulley fixedly mounted on said vertical post, each of said journal bearing housings surrounding said toothed synchronous belt in such close proximity and circumferential extent as to prevent any disengagement or slippage between said synchronous belt and the toothed pulleys.

2. The wheeled support or carrier according to claim 1, wherein said folding struts extending between said left and right side frames comprise a centrally pivoted scissors arrangement.

3. The wheeled support or carrier according to claim 1, wherein said folding struts extending between said left and right side frames comprise a centrally hinged vertical brace frames.

4. The wheeled support or carrier according to claim 1, wherein each of said front wheels is rollably mounted on its vertical post via a fork fixed to said vertical swivel post.

5. The wheeled support or carrier according to claim 1, wherein each of said front wheels is unlimitedly swivelable about a vertical axis.

6. The wheeled support or carrier according to claim 1, wherein said synchronous belt is tethered to a point or points on said folding struts, which moves or move upwards as the wheeled support or carrier is folded up, said tether comprising a loose loop or ring through which the synchronous belt freely runs and a tether cord passing through or attached to said loop or ring, whereby the midpoint of said synchronous belt is pulled rearward as the wheeled support or carrier is folded up.

7. The wheeled support or carrier according to claim 6, wherein said ring, through which the synchronous belt runs, is in the form of a rigid frame freely rotatably holding within it an externally toothed wheel engaging on diametrically opposite sides said synchronous belt.

8. The wheeled support or carrier according to claim 2, wherein each of said front wheels is unlimitedly swivelable about a vertical axis.

9. The wheeled support or carrier according to claim 3, wherein each of said front wheels is unlimitedly swivelable about a vertical axis.

10. The wheeled support or carrier according to claim 4, wherein each of said front wheels is unlimitedly swivelable about a vertical axis.

11. The wheeled support or carrier according to claim 2, wherein said synchronous belt is tethered to a point or points on said folding struts, which moves or move upwards as the wheeled support or carrier is folded up, said tether comprising a loose loop or ring through which the synchronous belt freely runs and a tether cord passing through or attached to said loop or ring, whereby the midpoint of said synchronous belt is pulled rearward as the wheeled support or carrier is folded up.

12. The wheeled support or carrier according to claim 3, wherein said synchronous belt is tethered to a point or points on said folding struts, which moves or move upwards as the wheeled support or carrier is folded up, said tether comprising a loose loop or ring through which the synchronous belt freely runs and a tether cord passing through or attached to said loop or ring, whereby the midpoint of said synchronous belt is pulled rearward as the wheeled support or carrier is folded up.

13. The wheeled support or carrier according to claim 4, wherein said synchronous belt is tethered to a point or points on said folding struts, which moves or move upwards as the wheeled support or carrier is folded up, said tether comprising a loose loop or ring through which the synchronous belt freely runs and a tether cord passing through or attached to said loop or ring, whereby the midpoint of said synchronous belt is pulled rearward as the wheeled support or carrier is folded up.

14. A collapsible hand-propelled wheeled support or carrier, such as a rollator, walker, pushchair or stroller, comprising:
 a) left and right side frames each supporting at least individual front and rear wheels;
 b) each of said front wheels being mounted on a vertical post and swivelable about a vertical axis;
 c) sprockets fixedly mounted one on each post;
 d) a flexible synchronous chain engaging each sprocket and extending between them;
 e) folding struts extending between said left and right side frames, permitting moving said left and right frames laterally towards each other to a collapsed or folded storage position and away from each other to an expanded or folded-out stable position for use of the wheeled support or carrier; and
 f) journal bearing housings fixedly mounted on each of said left and right frames and each swivelably holding one each of said vertical posts with said sprocket fixedly mounted on said vertical post, each of said journal bearing housings surrounding said synchronous chain in such close proximity and circumferential extent as to prevent any disengagement or slippage between said synchronous chain and the sprockets.

15. The wheeled support or carrier according to claim 14, wherein said folding struts extending between said left and right side frames comprise a centrally pivoted scissors arrangement.

16. The wheeled support or carrier according to claim 14, wherein said folding struts extending between said left and right side frames comprise a centrally hinged vertical brace frames.

17. The wheeled support or carrier according to claim 14, wherein each of said front wheels is rollably mounted on its vertical post via a fork fixed to said vertical swivel post.

18. The wheeled support or carrier according to claim 14, wherein each of said front wheels is unlimitedly swivelable about a vertical axis.

19. The wheeled support or carrier according to claim 14, wherein said synchronous chain is tethered to a point or points on said folding struts, which moves or move upwards as the wheeled support or carrier is folded up, said tether comprising a loose loop or ring through which the synchronous chain freely runs and a tether cord passing through or attached to said loop or ring, whereby the midpoint of said synchronous chain is pulled rearward as the wheeled support or carrier is folded up.

20. The wheeled support or carrier according to claim 19, wherein said ring, through which the synchronous chain runs, is in the form of a rigid frame freely rotatably holding within it an externally toothed wheel engaging on diametrically opposite sides said synchronous chain.

* * * * *